US011507673B1

(12) United States Patent
Ouzan et al.

(10) Patent No.: US 11,507,673 B1
(45) Date of Patent: Nov. 22, 2022

(54) ADAPTIVE CYBER-ATTACK EMULATION

(71) Applicant: Apolyta Inc., Sunnyvale, CA (US)

(72) Inventors: Freddy Ouzan, Sunnyvale, CA (US); Mauricio Sandt, Aachen (DE)

(73) Assignee: APOLYTA INC., Sunnyvale, CA (US)

( * ) Notice: Subject to any disclaimer, the term of this patent is extended or adjusted under 35 U.S.C. 154(b) by 0 days.

(21) Appl. No.: 17/715,075

(22) Filed: Apr. 7, 2022

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC .......................... G06F 21/577; G06F 2221/034
See application file for complete search history.

(56) References Cited

U.S. PATENT DOCUMENTS

| | | | |
|---|---|---|---|
| 8,782,796 B2 | 7/2014 | Hawthorn et al. | |
| 2014/0325658 A1* | 10/2014 | Schweitzer | G06F 21/55 726/25 |
| 2015/0229660 A1* | 8/2015 | Palmin | H04L 63/1416 726/23 |
| 2016/0044057 A1 | 2/2016 | Chenette et al. | |
| 2017/0006055 A1* | 1/2017 | Strom | G06F 30/20 |
| 2019/0173907 A1* | 6/2019 | Kras | H04L 63/1483 |
| 2020/0151305 A1* | 5/2020 | Lam | G06F 8/41 |
| 2021/0165882 A1* | 6/2021 | Das | G06F 21/563 |
| 2021/0264038 A1* | 8/2021 | Butchko | G06N 7/005 |
| 2021/0320941 A1 | 10/2021 | e Silva et al. | |
| 2021/0320945 A1 | 10/2021 | Black et al. | |
| 2022/0006830 A1* | 1/2022 | Wescoe | H04L 63/1433 |
| 2022/0053012 A1* | 2/2022 | Nishijima | G06F 21/55 |

FOREIGN PATENT DOCUMENTS

WO 2017147472 A1 8/2017

* cited by examiner

*Primary Examiner* — Meng Li
(74) *Attorney, Agent, or Firm* — Kligler & Associates Patent Attorneys Ltd

(57) ABSTRACT

A system for cyber-attack emulation includes a memory and one or more processors. The memory is configured to store a library of attack-code templates, each attack-code template including configurable program code that carries out a respective type of cyber-attack. The one or more processors are configured to specify an attack-emulation campaign based on one or more of the attack-code templates, and, for at least a given attack-code template included in the attack-emulation campaign, to perform an iterative process including (i) generating an emulated attack from the given attack-code template, (ii) applying the emulated attack to a component of a target computer system, (iii) evaluating an interim outcome of the emulated attack, and (iv) adapting the emulated attack depending on the interim outcome.

16 Claims, 3 Drawing Sheets

ADAPTIVE CYBER-ATTACK EMULATION

FIELD OF THE INVENTION

The present invention relates generally to cyber security, and particularly to methods and systems for cyber-attack emulation.

BACKGROUND OF THE INVENTION

Computer systems, particularly those connected to the Internet, are under constant threat of cyber-attacks. Cyber-attacks may attempt to exfiltrate sensitive data, to destroy data, or to hijack data in request of ransom, for example. Known cyber-security measures, including Breach and Attack Simulation (BAS) solutions and automated penetration testing tools, typically involve scanning for known vulnerabilities and reproduction of previously-encountered attacks. Example BAS tools include Atomic Red Team, as well as tools provided by companies such as AttackIQ, XM Cyber, Pentera, SafeBreach, Picus Security, Randori, Scythe, Cymulate, and Mandiant (formerly Verodin).

SUMMARY OF THE INVENTION

An embodiment of the present invention that are described herein provide a system for cyber-attack emulation, including a memory and one or more processors. The memory is configured to store a library of attack-code templates, each attack-code template including configurable program code that carries out a respective type of cyber-attack. The one or more processors are configured to specify an attack-emulation campaign based on one or more of the attack-code templates, and, for at least a given attack-code template included in the attack-emulation campaign, to perform an iterative process including (i) generating an emulated attack from the given attack-code template, (ii) applying the emulated attack to a component of a target computer system, (iii) evaluating an interim outcome of the emulated attack, and (iv) adapting the emulated attack depending on the interim outcome.

In an embodiment, the one or more processors are configured to adapt the emulated attack by modifying one or more parameters of the emulated attack. In another embodiment, the one or more processors are configured to adapt the emulated attack by modifying a code obfuscation scheme used by the emulated attack. In yet another embodiment, the one or more processors are configured to adapt the emulated attack by modifying an evasion scheme used by the emulated attack.

In still another embodiment, the one or more processors are configured to adapt the emulated attack by modifying source code of the emulated attack and re-compiling the modified source code. In an example embodiment, the one or more processors are configured to adapt the emulated attack by modifying machine code of the emulated attack. In an embodiment, in performing the iterative process, the one or more processors are configured to switch from the given attack-code template to another attack-code template.

In some embodiments, the one or more processors are configured to adapt the emulated attack by (i) identifying that the emulated attack was detected, (ii) applying a first adaptation to the emulated attack upon identifying that the emulated attack was detected by static detection, and (iii) applying a second adaptation to the emulated attack, different from the first adaptation, upon identifying that the emulated attack was detected by dynamic detection. In an example embodiment, the first adaptation includes adding a code obfuscation scheme to the emulated attack, and the second adaptation includes adding an evasion scheme to the emulated attack.

In some embodiments, the one or more processors are further configured to apply benign software code to one or more components of the target computer system, and to evaluate a response of the target computer system to the benign software code.

There is additionally provided, in accordance with an embodiment of the present invention, a method for cyber-attack emulation. The method includes storing a library of attack-code templates, each attack-code template including configurable program code that carries out a respective type of cyber-attack. An attack-emulation campaign is specified based on one or more of the attack-code templates. For at least a given attack-code template included in the attack-emulation campaign, an iterative process is performed, including (i) generating an emulated attack from the given attack-code template, (ii) applying the emulated attack to a component of a target computer system, (iii) evaluating an interim outcome of the emulated attack, and (iv) adapting the emulated attack depending on the interim outcome.

The present invention will be more fully understood from the following detailed description of the embodiments thereof, taken together with the drawings in which:

DETAILED DESCRIPTION OF EMBODIMENTS

Overview

Figure 1:
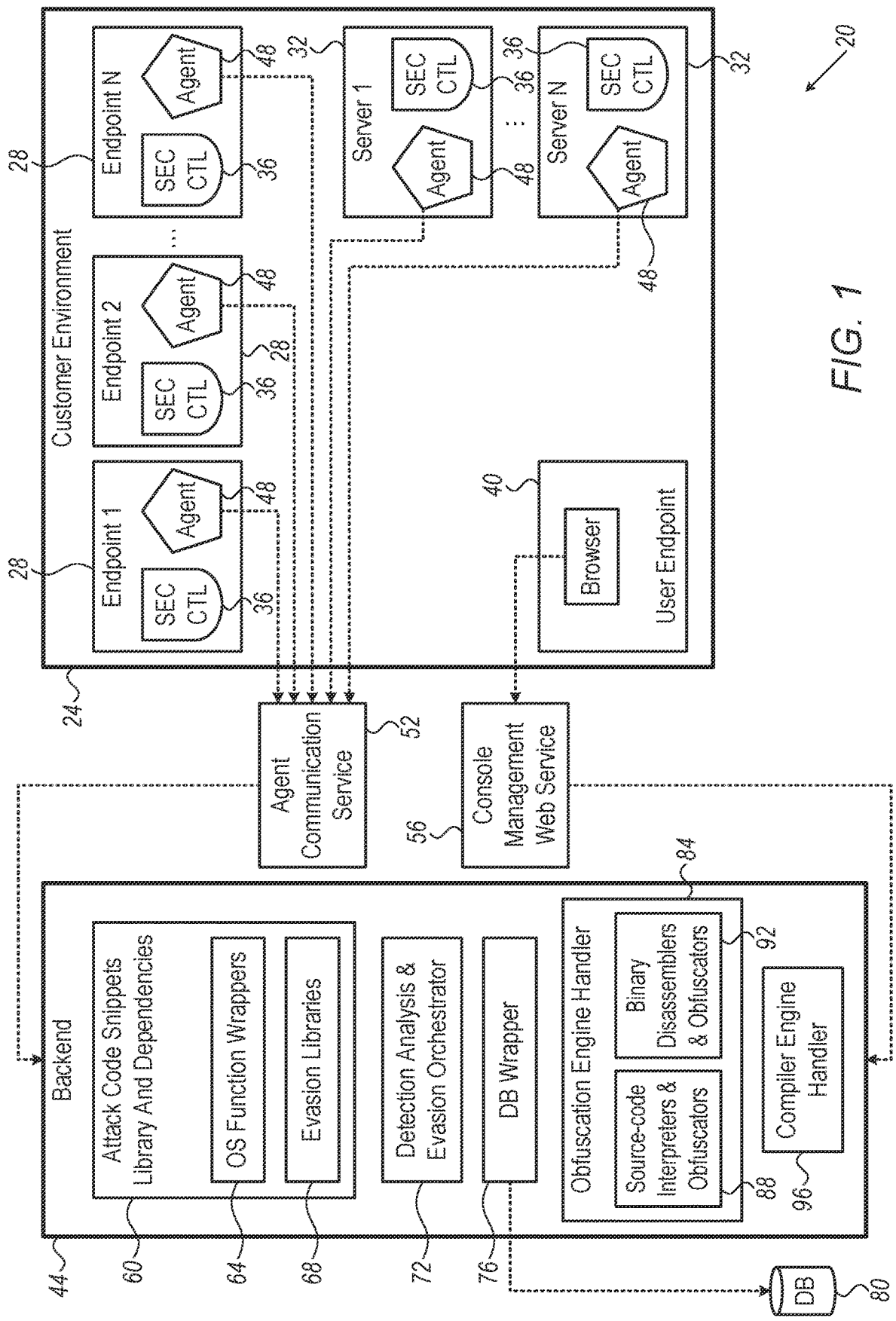
FIG. 1 is a block diagram that schematically illustrates an adaptive cyber-attack emulation system, in accordance with an embodiment of the present invention.

One of the major drawbacks of conventional Breach and Attack Simulation (BAS) tools is the fact that they are based on reproduction of known cyber-attacks, iterating over a static list of predefined attack scenarios. As such, conventional BAS tools are extremely limited in their ability to assess the resilience of a target system against new, unknown threats.

Embodiments of the present invention that are described herein provide improved methods and systems for cyber-attack emulation. The disclosed techniques test a customer's target system by emulating, possibly in real-time, cyber-attacks that are not previously known. The disclosed techniques evaluate the resilience of the target system to the emulated cyber-attacks, and adapt the emulated attacks depending on the evaluation results. In this manner, the disclosed techniques learn the logic and capabilities of the target system, and devise new ways to evade detection and deliver attacks successfully. Such an iterative, adaptive process is highly effective in predicting the true performance of the target system's security controls against unknown real-world cyber threats. In some embodiments, a cyber-attack emulation system comprises multiple software agents ("agents") and a backend subsystem ("backend"). The agents are deployed in endpoints such as workstations and servers of the target system, and are configured to apply emulated cyber-attacks specified by the backend, assess results of the attacks, and report back to the backend. The backend comprises an internal engine component that orchestrates the attack emulation process and controls the agents. In particular, the backend adapts the emulated attacks based on the results reported by the agents, and supplies the agents with modified attacks.

In some embodiments, the backend comprises a library of attack-code templates, referred to herein as "code snippets" or simply "snippets" for brevity. Each code snippet comprises configurable program code that carries out a respective type of cyber-attack with critical business impact, including but not limited to attack-objectives such as data exfiltration and data manipulation, e.g., sensitive files stealers, credentials extraction, memory scrapers, espionage, or ransomware and wiper attacks. Attacks may also include other modules including but not limited to espionage (e.g., camera, audio recording—or keylogging), backdoors (e.g., user-group management), discovery and reconnaissance, lateral movement, persistence, privilege escalation, or tampering of security controls that could allow any of the aforementioned (or more) attacks to take place, by rendering a security mechanism blind/useless.

The attacks derived from the various snippets are configurable in several ways. Configurability may involve, for example, setting of parameters, configuring the way the attack is delivered to the target system, and/or configuring the way the attack evades detection, e.g., using different code obfuscation techniques and/or alternate behavioral paths. For this purpose, the emulation system typically comprises a set of Operating System (OS) functions' and system-calls' wrappers and libraries of evasion schemes.

A typical attack-emulation campaign begins with a request from a user, e.g., an administrator or security professional, but could also be triggered by an automated task that was set by the user to start a campaign based on schedule or events. In response to the user's request, the emulation system specifies the attack-emulation campaign in terms of one or more of the code snippets. For a given code snippet, the emulation system performs an iterative process comprising (i) generating an emulated attack from the given attack-code template, (ii) applying the emulated attack to one or more components of the target system, (iii) evaluating an interim outcome of the emulated attack, and (iv) adapting the emulated attack depending on the interim outcome.

Adaptation of an emulated attack from one iteration to the next may involve, for example, changing parameters of the attack, changing a delivery scheme of the attack, changing an evasion scheme used by the attack, changing a code obfuscation scheme used by the attack, or a combination of such changes. Adaptation of an emulated attack may or may not involve re-compilation of the attack code. When a certain attack type has been exhausted, the engine may switch to a different type of attack based on a different code snippet.

By using such an adaptive approach, the emulation system gradually learns the strengths and weaknesses of the target system's security controls, how to evade detection and how to launch emulated attacks successfully. This information is highly valuable for benchmarking, understanding, and then improving, the security of the target system. Such gradual learning and improvement also enables the system to generate short, focused reports that pinpoint the exact security weaknesses that require attention.

Several examples of adaptive attack-emulation processes are described herein. Various system implementations are also described. For example, the emulation system may support a "normal" mode in which the attack emulation is guaranteed not to damage data in the target system, and an "aggressive" mode that may damage data and is typically applied only in lab environments.

System Description

FIG. 1 is a block diagram that schematically illustrates an adaptive cyber-attack emulation system 20, in accordance with an embodiment of the present invention. System 20 evaluates the resilience of a customer environment 24 to cyber-attacks, and measures the efficacy of each security control. Customer environment 24, also referred to herein as a "target computer system" or "target system", may comprise, for example, a data center, a corporate network, or any other suitable type of computing system. In various embodiments, customer environment 24 may be located on the customer's premises, in a private or public cloud, or at any other suitable location.

Customer environment 24 typically comprises multiple endpoints 28 (e.g., personal computers or mobile/IOT) and servers 32. The endpoints and servers are jointly referred to herein as "system components". Typically, each system component (e.g., endpoint 28 or server 32) comprises suitable security controls 36 for detecting and mitigating cyber-attacks. Security controls may comprise, for example, antivirus or anti-ransomware software, endpoint detection and response, behavioral sensors, firewalls, intrusion detection or prevention systems, application control/allow-listing, and the like.

In some embodiments, security controls 36 on a given system component aim to protect that individual system component. In other embodiments, security controls 36 on a given system component aim to protect other components, e.g., in the case of a firewall that runs on a server 32 for protecting multiple endpoints 28, or in the case of a network appliance. As such, security controls 36 may be installed on only some of the endpoints and servers.

In some embodiments, e.g., in an on-premises customer environment, endpoints 28 and servers 32 comprise physical computers. In other embodiments, e.g., in a cloud-based customer environment, endpoints 28 and servers 32 may comprise Virtual Machines (VMs), or vice versa. The embodiments described herein refer mainly to endpoints such as workstations and servers. The disclosed attack emulation techniques are applicable, however, to various other types of system components, for example Internet of Things (IoT) and mobile devices, medical devices, network appliances, or embedded systems.

In some embodiments, system 20 comprises a backend subsystem 44 and multiple emulation agents 48 that jointly carry out the disclosed techniques. For brevity, the backend subsystem and the emulation agents are referred to herein as "backend" and "agents", respectively. In the present example, each agent 48 runs on a respective system component (e.g., endpoint 28 or server 32) for evaluating the respective security controls 36 of that system component. This one-to-one relationship, however, is by no means not mandatory. For example, a given agent 48 may be assigned to evaluate security controls 36 of multiple system components.

In the present example, backend 44 and agents 48 communicate with one another using an agent-communication service 52. System 20 further comprises a user endpoint 40 that serves as an access point to a management console for the emulation system. Users (e.g., a system administrator or security professional) manages the emulation system via a browser. Alternatively, users can manage the emulation system via a mobile application, a desktop application, or using any other suitable means.

User endpoint 40 communicates with backend 44 via a console-management web service 56.

In the example embodiment of FIG. 1, backend 44 comprises the following components, whose structure and operation are described in detail further below:

One or more libraries (also referred to as a "pool") 60 of attack code snippets. In addition to code snippets, libraries 60 further comprise multiple OS function wrappers 64 and one or more libraries 68 of evasion schemes.

A detection analysis & evasion orchestrator 72.

A database (DB) wrapper 76 connected to a DB 80.

An obfuscation engine handler 84, which comprises source-code interpreters and obfuscators 88 (per different programming and scripting languages) and binary disassemblers & obfuscators/re-assemblers 92 (per different binary formats & architectures).

A compiler engine handler 96.

The configurations of emulation system 20 and its various components, e.g., backend 44 and agents 48, as shown in FIG. 1, are example configurations that are depicted purely for the sake of conceptual clarity. In alternative embodiments, any other suitable configurations can be used. For example, the various components of backend 44 may be divided into different programs or libraries and may communicate directly or indirectly with the backend. Any of the components of backend 44 may be implemented as one or more microservices that communicate with the backend via a suitable interface. More generally, the internal partitioning of backend 44 into components, and the "division of labor" among them, are depicted in the figure purely by way of example.

In various embodiments, emulation system 20, target system 24 and their various components may be implemented using any suitable software or hardware architecture and any suitable "division of labor" among the various software and hardware components. For example, backend 44 may be implemented using one or more processors (e.g., servers or other computers). The processors may be physical and/or virtual. In some embodiments backend 44 may be implemented as a cloud-based application or service.

In various embodiments, any of the processors or computers in emulation system 20 and target system 24 may be implemented using a programmable processor that is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Adaptive Emulation of Cyber-Attacks

In some embodiments, backend 44 constructs campaigns of emulated cyber-attacks from code snippets drawn from libraries 60. Each code snippet comprises configurable program code that carries out a respective type of cyber-attack, e.g., a specific type of data gathering, data exfiltration, data manipulation, data destruction, ransomware, credentials extraction, video or audio recording, screen capturing, keylogging, memory scrapers, security agents tampering, discovery and reconnaissance, lateral movement, privilege escalation, persistence, backdoor, hijacking legitimate applications or abusing operating system components, injecting malicious code to evade detection, or any other suitable type of attack.

Each code snippet typically has a specific goal, e.g., exfiltrating or manipulating data from an endpoint 28, a server 32 or a different system component, or any other type of attack objectives including but not limited to escalating privileges, or tampering with security controls through bypassing or shutting them down. The data targeted by a given snippet may be, for example, a file, credentials, or any other suitable type of data that may reside on either disk or memory.

In various embodiments, the code snippets may be provided with various degrees of configurability. For example, a code snippet may comprise a dummy file that is safe to use on a production system and only needs to be populated with parameters. A code snippet may comprise instructions that save data for reverting-to after the attack ends. As another example, a code snippet may allow the user to define the data to be attacked (e.g., exfiltrated), e.g., a user-specified protected folder.

For a given type of attack, libraries 60 may comprise multiple code snippets written in different languages, e.g., C/C++, Assembly, C#, PowerShell, VBScript, Go, Rust, Python, Lua, or any other suitable language. An attack code generated from a given snippet may comprise a compiled binary file, a script, a source file, or any other suitable format. An attack code generated from a given snippet may target various suitable operating systems, e.g., Windows, UNIX-like such as BSD-based, macOS, or Linux-based distributions, and the like, as well as mobile operating systems including but not limited to Android and iOS. Supported architectures may include but are not limited to X86, AMD64, or ARM.

The task of deriving specific emulated attacks from the code snippets is typically performed by orchestrator 72. When deriving a specific emulated attack from a given snippet, orchestrator 72 may configure the attack in various ways.

For example, the orchestrator may parse the snippet and its capabilities and objectives, and set various parameter values, such as names, paths, flags, intermediate values, hashes, attributes, or any other type of information to support the attack.

As another example, orchestrator 72 may choose the way the attack is delivered to the intended system component (e.g., endpoint 28 or server 32). For this purpose, backend 44 comprises OS function wrappers 64, from which code snippets may choose a suitable wrapper and use it for delivering the attack code.

As yet another example, orchestrator 72 may choose the way the attack evades detection by security controls 36. For this purpose, backend 44 comprises evasion libraries 68 that comprise multiple alternative evasion schemes. A given evasion scheme may be specific for a given type of attack, or generic. One example evasion scheme would be to call lower-level functions that might not be monitored by security controls 36. Another example evasion scheme would contain additional functionality to load the functions' addresses dynamically, e.g., using a custom loader that differs from the standard operating-system routines. Another evasion scheme example would be to call system calls directly.

Some evasion schemes use a different technique that would achieve the same objective/end-goal without triggering a filtering mechanism of security controls 36. In such embodiments, a set of evasion schemes can be leveraged depending on the response of the security controls. For example, if an attack is blocked by static-driven or signature-based detection, then the next variant of the attack may employ code obfuscation. As another example, if an attack is blocked by dynamic or behavioral detection, the next variant of the attack may employ a different evasion scheme rather than obfuscation. Some evasion schemes may be incorporated within OS function wrappers 64, whereas other evasion schemes may be external (e.g., direct system calls).

In some scenarios, evasion involves obfuscating the attack code. For this purpose, backend 44 comprises obfuscation engine handler 84, which in turn comprises source-code interpreter and obfuscator 88 and binary disassembler & obfuscator 92. Typically, although not necessarily, a change of obfuscation scheme is used to circumvent static detection, and a change of evasion scheme is used to evade dynamic detection.

In some embodiments, a code snippet comprises source code, and deriving an emulated attack from the snippet requires compilation. In such embodiments, orchestrator 72 invokes compiler engine handler 96 to compile the source code. Orchestrator 72 may perform code obfuscation pre-compilation (on the source-code) and/or post-compilation (e.g., on the compiled code).

In various embodiments, code obfuscation may be performed in backend 44 and/or in agents 48. For example, backend 44 may obfuscate source code of the attack and introduce static evasions that are easier to implement when having the source. Additionally or alternatively, in case of static detection that detects files as/after they are being saved to disk, agent 48 or backend 44 may find the smallest byte sequence (or multiple sequences) that triggers such detection, and manipulate it by disassembling and reassembling the logic in a way that (i) breaks the signature, yet (ii) keeps the logic and functionality the same. Such manipulation in the agent may comprise replacing instructions with equivalents, relocating small chunks of instructions and jumping back-and-forth between them, inserting junk or dummy bytes, and the like.

The obfuscation engine, either for source code or machine code (binary code), may include machine learning and/or artificial intelligence capabilities to improve and learn over time.

The goal of DB 80 and DB wrapper 76 is to retain data, and have a simple interface for getting reports, analysis, and comparing with past results (e.g., over a timeline, or against a defined baseline). DB wrapper 76 may comprise, for example, logic for communicating with database 80; containing information about the systems' users, generated attacks and their characteristics, behaviors, timeline, and attack results, such as response and verdict, i.e., whether or not the attack was blocked and why, as well as information about the security controls in place.

Figure 2:
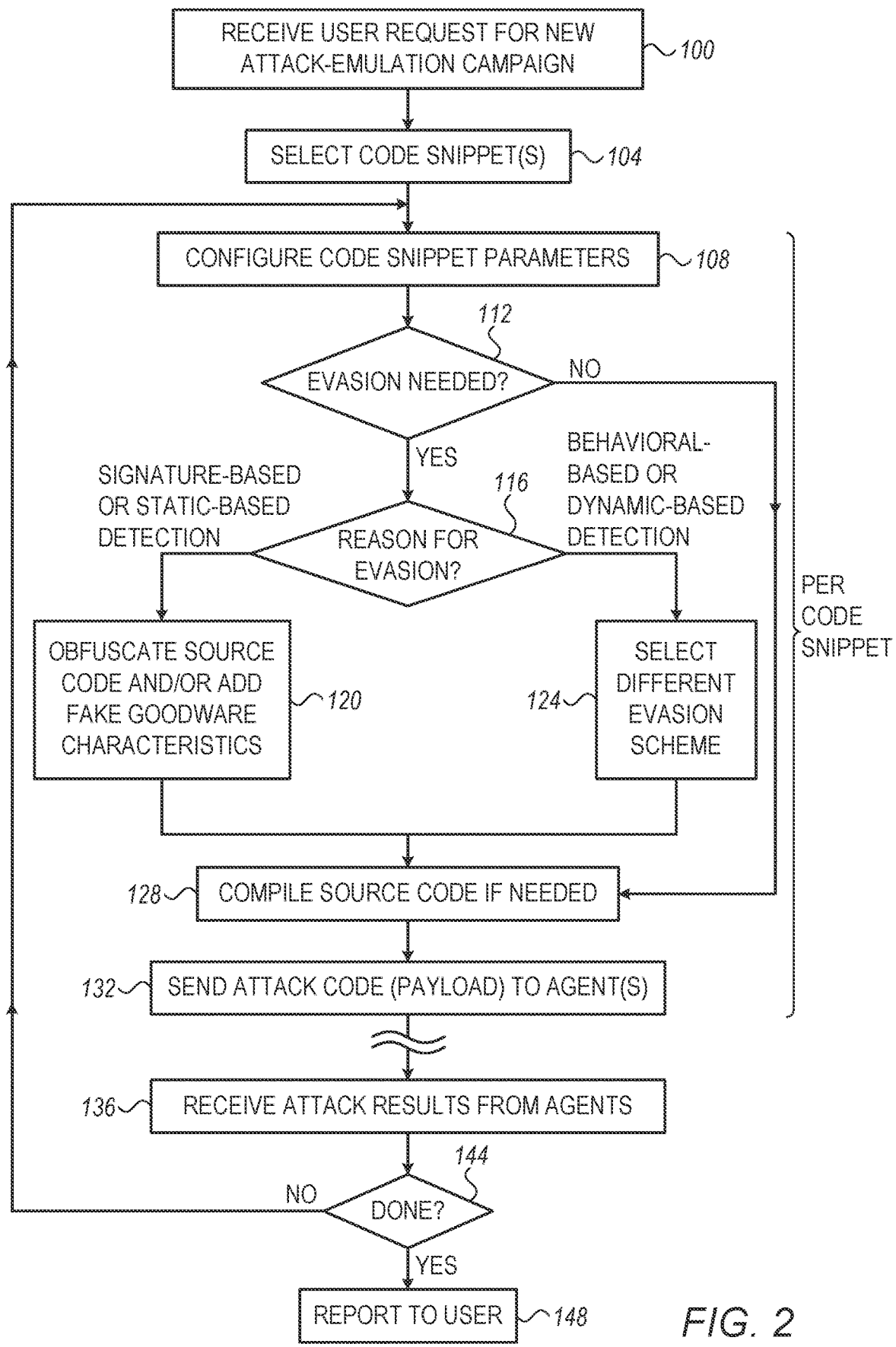
FIG. 2 is a flow chart that schematically illustrates a method for adaptive cyber-attack emulation, as performed by a backend subsystem of the system of FIG. 1, in accordance with an embodiment of the present invention.
Figure 3:
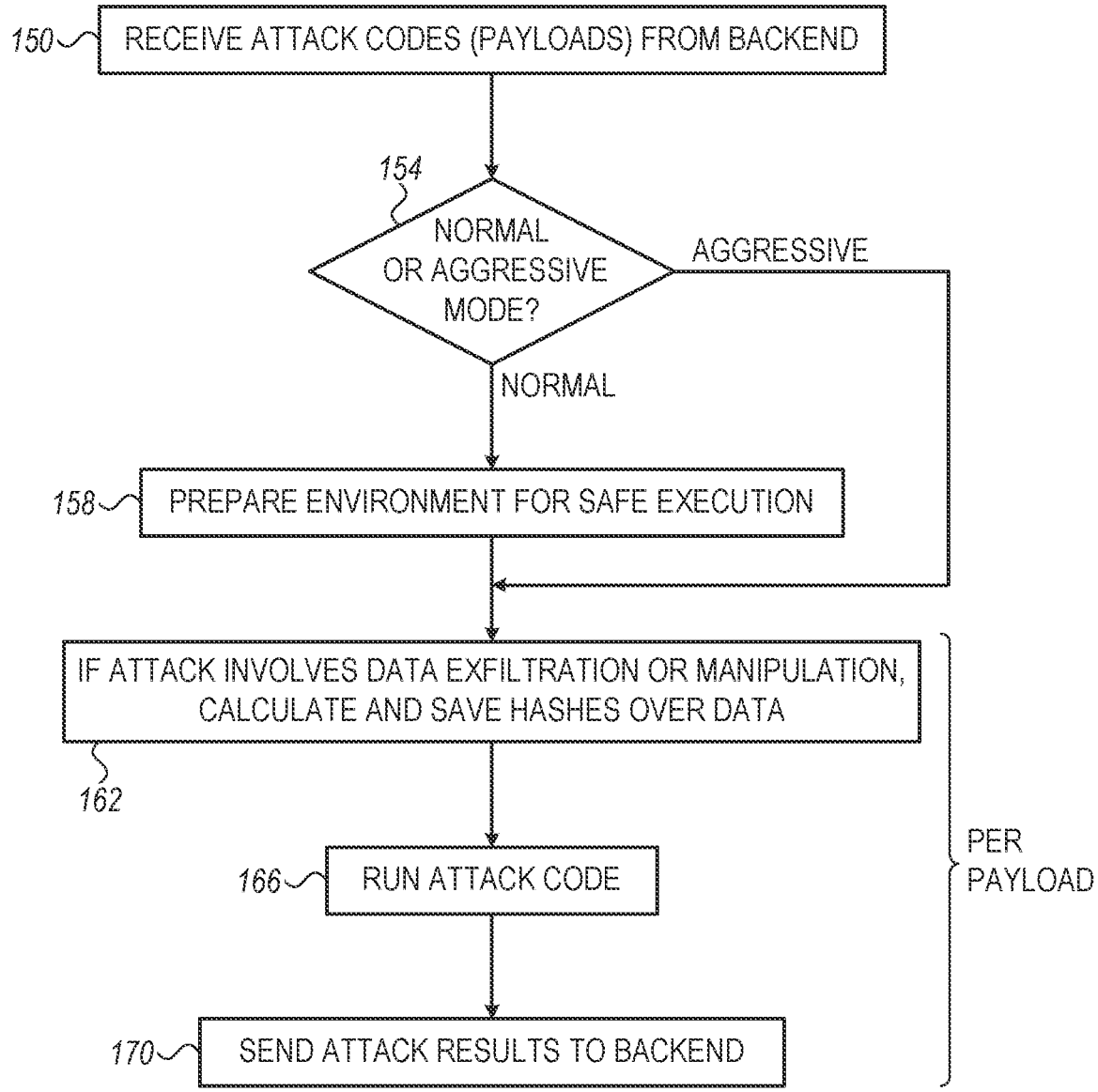
FIG. 3 is a flow chart that schematically illustrates a method for adaptive cyber-attack emulation, as performed by emulation agents of the system of FIG. 1, in accordance with an embodiment of the present invention.

FIGS. 2 and 3 are flow charts that schematically illustrate a method for adaptive cyber-attack emulation, performed by emulation system 20, in accordance with an embodiment of the present invention. FIG. 2 illustrates the part of the process performed by backend 44. FIG. 3 illustrates the part of the process performed by agents 48.

Reference is first made to FIG. 2. From the perspective of backend 44, the method of FIG. 2 begins with orchestrator 72 receiving a user request for a new attack-emulation campaign, via user endpoint 40, at a user requesting stage 100.

In some embodiments, the user may specify in the request (i) the objective of the campaign (e.g., data exfiltration, data manipulation, lateral movement, security tools tampering, or any other suitable objective), and (ii) the types of attacks to be included in the campaign (e.g., ransomware, data destruction, sensitive data theft, credentials extraction, video or audio recording, or any other suitable type of attack). In some embodiments, the system may use presets, such as best practices, for the attack objectives and types of attack. Additionally or alternatively, the system may enable skipping the user's selection so as to run in a default mode.

In other embodiments, the user merely requests a new campaign without having to specify any details or requirements. For example, the system may generate emulated attacks automatically based on scheduled tasks, possibly with predefined baseline structures.

Orchestrator 72 typically verifies that the user has the required permissions, and if so, begins the adaptive attack emulation process. The orchestrator may manage the state of the campaign using a state machine or other suitable means such as any artificial intelligence and/or machine learning, including artificial intelligence where the system learns over time.

At a snippet selection stage 104, orchestrator 72 selects one or more code snippets (attack-code templates) from libraries 60, to be used initially in the campaign.

Orchestrator 72 typically passes relevant flags and other relevant information, so as to provide compiler engine handler 96 or obfuscation engine handler 84 with context regarding which OS is being targeted, which evasions should be used, and the wrappers and libraries to be used.

The following stages (numbered 108-132 in the figure) are performed per each selected snippet. At a parameter configuration stage 108, orchestrator 72 configures the parameters of the code snippet. The orchestrator may, for example, process the source code of the snippet and its dependencies, and read and/or modify constants and/or variables or other parts of code or data as appropriate. Dependencies may be additional source files, headers, modules, or libraries, and the like (definition may vary depending on the language) that contain code and/or data for supporting different behaviors, evasion techniques, modes of operation, wrappers for OS routines, or any other logic/algorithm to support the attack emulation system. Those dependencies could be indirect or nested, and may be used by the code snippets or any of their dependencies.

At an evasion checking stage 112, the orchestrator checks whether an evasion scheme needs to be applied as part of the attack being generated. Typically, a new evasion scheme is called for when a previous attack based on the same snippet (a previous iteration of the process) was prevented (or in some cases detected) by security controls 36. The term "new" in this context means an evasion scheme that was not used with the present snippet in a previous iteration of the process.

If evasion is needed, orchestrator 72 proceeds to check the reason for needing evasion, and specifically determine the type of detection that was used for detecting the previous attack, at a detection-type checking stage 116.

If the previous prevention/detection was determined to have been triggered by a signature-based or static-based detection engine, orchestrator 72 invokes obfuscation engine handler 84 to apply a new code obfuscation scheme to the emulated attack code, at an obfuscation stage 120. Here, too, the term "new" means an obfuscation scheme that was not used with the present snippet in a previous iteration of the process. Additionally or alternatively to code obfuscation, orchestrator 72 may add fake "goodware" characteristics to the attack code. For performing obfuscation, orchestrator 72 may invoke either source-code interpreter and obfuscator 88 or binary disassembler & obfuscator 82, e.g., depending on whether the new obfuscation scheme is pre-compilation or post-compilation, or whether the attack generation does not involve compilation at all.

If, on the other hand, the previous prevention/detection was determined to have been triggered by a behavioral-based control or dynamic-based detection engine, orchestrator 72 selects a new matching evasion scheme from evasion libraries 68, at an evasion selection stage 124. If compilation is needed in order to generate the attack code, orchestrator 72 invokes compiler engine handler 96, at a compilation stage 128.

If the outcome of stage 112 is that no evasion is needed (e.g., because this is the first iteration of the process or because the attack of the previous iteration was not detected), the method skips stages 116-124 and jumps directly from stage 112 to stage 128.

At a sending stage 132, orchestrator 72 adds the newly generated attack code (also referred to as payload) to the attack queue, and sends the payload to one or more of agents 48 in target system 24. In some embodiments, the payload is marked with one or more fingerprints (e.g., unique random byte sequence) that enable the system to trace it back to the original campaign. This feature is useful, for example, for discovering and investigating unauthorized leakage or misuse of an attack payload.

In some embodiments the attack code is sent to all agents 48. In other embodiments the orchestrator selects a suitable subset of agents 48, and sends the attack code only to the selected agents 48.

In some embodiments, orchestrator 72 may instruct agents 48 to replay an attack, or an existing campaign. When replaying an attack, orchestrator 72 may compare current results to the results of a previous run, and also have toggle between evasions for the replayed attack. This technique enables the system to not only verify that an improvement was implemented properly, but to measure the quality of the security control and evaluate how easy or complex it is to overcome it.

Each agent 48, upon receiving the attack code from backend 44, carries out the attack on its respective system component (e.g., endpoint 28 or server 32), according to the flow chart of FIG. 3 below.

At a result reception stage 136, orchestrator 72 receives reports from agents 48, reporting the interim outcome of the current iteration of the campaign. At a completion checking stage 144, orchestrator 72 checks whether the attack-emulation campaign is completed. If so, the orchestrator prepares a final report to the user, and the method terminates. (In an embodiment, an immediate report is made available to the user, and is updated from one session to the next until the campaign is completed.) Otherwise, the method loops back to stage 108 above, for adapting the next attack iteration based on the results of the present iteration. As noted above, if more than a single snippet was chosen for the campaign at stage 104 above, then stages 108-132 are carried out per code snippet.

Reference is now made to FIG. 3, which depicts the attack emulation process from the perspective of a certain agent 48.

In some embodiments, agent 48 supports two operational modes—a "normal" mode and an "aggressive" mode. In the normal mode (also referred to as a "safe" mode), attack emulation is designed to run on a customer's operational target system, i.e., in a production environment. As such, the emulated attacks should not damage or irreversibly modify data or metadata of the target system. The aggressive mode (also referred to as an "unsafe" mode) is designed to run in lab environments, not in production environments. Therefore, in the aggressive mode the attacks are permitted to corrupt data or otherwise cause irreversible modifications or damage to the target system. A given attack-emulation campaign can be configured to run either in the normal mode or in the aggressive mode.

In some embodiment, as a safety measure, a given attack-emulation campaign is not permitted to escalate from the normal mode to the aggressive mode on an agent 48 that runs in the normal mode. On the other hand, an agent 48 running in the aggressive mode is permitted to execute campaigns that are defined in the normal mode.

The method of FIG. 3 begins with an agent 48 receiving one or more attack codes (payloads) from backend 44, at an attack reception stage 150. The agent typically saves the attack code to disk (in cases where the attack code comprises a file) or loads it onto memory (in case of a file-less attack).

In various embodiments, the method of execution of the attack may vary. In some embodiments an attack could be executed directly by the agent process, but in other embodiments the attack would be started through other means, either directly or indirectly, leveraging different execution methods, sometimes for avoiding having a parent/child-process relationship that could potentially be abused by security vendors to detect a testing session in action, without having proper detections to prevent the damage from occurring.

The agent may then prepare required instructions for the attack as needed, e.g., pre-attack instructions to be performed before the attack, intra-attack instructions to be performed during the attack, and/or post-attack instructions to be performed following the attack. In some embodiments, agent 48 is capable of performing some limited evasion on its own initiative, in addition to or instead of the evasion scheme that may be specified by backend 44.

At a mode checking stage 154, agent 48 checks whether the applicable mode (the mode in which the agent is configured to run) is the "normal" mode or the "aggressive" mode.

If the applicable mode is the normal mode, agent 48 prepares its environment (typically the endpoint or server it runs on) for safe execution of the attack, at a preparation stage 158. For example, agent 48 may save copies of data that the attack is supposed to manipulate, in order to return the data to its original state following the attack, or create the corresponding data objects containing patterns of sensitive information, to avoid putting sensitive data at risk. If, on the other hand, the applicable mode is the aggressive mode, stage 158 is skipped.

At a hashing stage 162, agent 48 calculates hashes of data that the attack is supposed to manipulate or exfiltrate. The agent saves the calculated hashes to memory. The hashes are useful, for example, in order to perform integrity checks on data following the attack. The hashes also enable the agent to verify whether or not the attack was completed successfully, without having to rely solely on error codes and on expected behavior. Additionally or alternatively to hashing, agent 48 may use any other suitable information for verifying whether an attack succeeded or failed.

At an attack execution stage 166, the agent carries out the emulated attack by running the attack code on the designated system component (e.g., endpoint or server).

At any stage before, during and/or after the attack, the attack code may update the agent with its progress, errors, or other information. For example, the attack code may send the agent an error code that is null if the attack was successful, and otherwise be indicative of the specific error that caused the attack to fail. The attack code may send the agent any other suitable information regarding progress, success or failure of the attack, including, for example, errors, warnings or any other informative description of an event.

In various embodiments, the attack code may communicate with the agent using any suitable communication means, e.g., using a pipe, using any inter-process communication mechanisms provided by the OS (either documented or undocumented), via a shared memory or file, or using any other suitable mechanism.

Based on the information provided by the attack code, agent 48 prepares and sends a report to backend 44, at a reporting stage 170. The report summarizes the interim outcome of the present iteration of the attack campaign.

The method flows of FIGS. 2 and 3 are example flows that are depicted purely for the sake of conceptual clarity. In alternative embodiments, the disclosed techniques can be implemented using any other suitable flow.

In some embodiments, emulation system 20 may emulate not only attacks but also non-destructive software, and evaluate the reaction of security controls 36 to such benign software code. This technique enables system 20 to identify scenarios in which security controls 36 are over-protective, i.e., block or otherwise act upon software that does no harm. This sort of over-reaction, which may be regarded as a "false-positive" reaction, is typically undesirable and there is value in detecting, analyzing and reporting it. In example embodiments, backend 44 is capable of instructing agents 48 to execute benign software code on specified components of target system 24. Benign software code is designed to not cause any damage and not access any sensitive information. Backend 44 may derive benign software code from a pool of code snippets, similarly to the techniques described above with respect to attacks. System 20 may assess whether such programs are blocked or otherwise reacted to by security controls 36, and report the results.

Example Use-Case—Data Manipulation Attack-Emulation Campaign

The following description walks through an example flow of a data manipulation attack-emulation campaign. The description below is provided as a non-limiting example, purely for the sake of demonstrating the concept of adapting emulated attacks based on the outcome of previous attacks.

In the present example, one of the attack types in the campaign is a ransomware attack, as defined by a corresponding code snippet. An initial version of the attack is generated by orchestrator 72 with no code obfuscation and no evasion scheme. If the initial version is not blocked, i.e., succeeds, orchestrator 72 will not continue to generate additional variants for this attack type. Instead, the orchestrator will proceed to execute other types of attacks according to the campaign definition.

Otherwise, i.e., if the initial version of the attack was blocked, orchestrator 72 will generate subsequent variants of the data wiper attack. The subsequent variants are selected/ configured depending on how and when the initial version was blocked.

For example, if the attack was blocked before reaching its intended entry point (i.e., pre-execution), orchestrator 72 may detect that the blocking was performed by a static detection engine, e.g., by correlating with other parameters such as the process exit code (or error code received when trying to launch the attack, if any). In such a case, orchestrator 72 may decide to generate the next variant of the attack with a suitable evasion scheme. The evasion scheme may involve obfuscation and could be generated by agent 48 (e.g., by manipulating the attack payload to save resource usage and time) or by backend 44 (e.g., if the former failed).

If, on the other hand, the wiper attack was blocked at a later stage, for example when trying to destroy the data by calling the delete file function, orchestrator 72 may conclude that the blocking was performed by a dynamic detection engine. In such a case, orchestrator 72 may decide to generate the next variant of the attack with a suitable evasion scheme. A suitable evasion scheme may involve, for example, calling a lower-level function that may not be monitored by security controls 36, attempting loading functions' addresses dynamically without relying on OS facilities that might be monitored by security controls 36, or even use different functionality that would help achieving the same end goal (destroying original data after creating an encrypted form) without triggering a security control's callback.

For example, if the attack was blocked upon deleting the original data using 'deletefile', orchestrator 72 may attempt achieving the same goal using an alternative mechanism. Alternative mechanisms to 'deletefile' may comprise, for example, using 'movefile' (replacing the destination with dummy data), writing data directly to the original file, writing through memory-mapping so that the memory-manager would handle the write to disk, calling any function that would empty the file's content (such as setendoffile, allocationinfo, or devioctl with set zero data), calling 'CreateFile' with delete-on-close flag, using hardlinks, or any other suitable mechanism.

Although the embodiments described herein mainly address file-manipulation attacks such as wipers, ransomware, and the like, the methods and systems described herein can also be used in other variations or applications, such as in memory-based attacks (whether if exfiltration as in memory scraping or manipulation as in patching memory), or network-level attacks, whether related or unrelated to data exfiltration or manipulation, such as lateral movement, security agent tampering, or credentials extraction, keylogging, screenshot grabbing, camera/audio recording, or using any techniques to bypass or circumvent security controls, such as by injecting malicious code, hijacking or side-loading trusted or excluded applications, simulating supply-chain attacks, and so on.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system for cyber-attack emulation, comprising:
   a memory, configured to store a library of attack-code templates, each attack-code template comprising configurable program code that carries out a respective type of cyber-attack; and
   one or more processors, configured to:
      specify an attack-emulation campaign based on one or more of the attack-code templates; and
      for at least a given attack-code template included in the attack-emulation campaign, perform an iterative process comprising (i) generating an emulated attack from the given attack-code template, (ii) applying the emulated attack to a component of a target computer system in a given iteration of the iterative process, (iii) monitoring the target computer system so as to evaluate an interim outcome of the emulated attack, (iv) adapting the emulated attack depending on the interim outcome, and (v) in a subsequent iteration of the iterative process, applying the adapted emulated attack, which was adapted depending on the interim outcome of the given iteration, to the component of the target computer system,
   wherein the one or more processors are configured to adapt the emulated attack by:
      identifying that the emulated attack was detected;
      upon identifying that the emulated attack was detected by static detection, adding a code obfuscation scheme to the emulated attack; and
      upon identifying that the emulated attack was detected by dynamic detection, adding an evasion scheme to the emulated attack.

2. The system according to claim 1, wherein the one or more processors are configured to adapt the emulated attack by modifying one or more parameters of the emulated attack.

3. The system according to claim 1, wherein the one or more processors are configured to adapt the emulated attack by modifying a code obfuscation scheme used by the emulated attack.

4. The system according to claim 1, wherein the one or more processors are configured to adapt the emulated attack by modifying an evasion scheme used by the emulated attack.

5. The system according to claim 1, wherein the one or more processors are configured to adapt the emulated attack by modifying source code of the emulated attack and re-compiling the modified source code.

6. The system according to claim 1, wherein the one or more processors are configured to adapt the emulated attack by modifying machine code of the emulated attack.

7. The system according to claim 1, wherein, in performing the iterative process, the one or more processors are configured to switch from the given attack-code template to another attack-code template.

8. The system according to claim 1, wherein the one or more processors are further configured to apply benign software code to one or more components of the target computer system, and to evaluate a response of the target computer system to the benign software code.

9. A method for cyber-attack emulation, comprising:
   storing a library of attack-code templates, each attack-code template comprising configurable program code that carries out a respective type of cyber-attack;
   specifying an attack-emulation campaign based on one or more of the attack-code templates; and
   for at least a given attack-code template included in the attack-emulation campaign, perform an iterative process comprising (i) generating an emulated attack from the given attack-code template, (ii) applying the emulated attack to a component of a target computer system in a given iteration of the iterative process, (iii) monitoring the target computer system so as to evaluate an interim outcome of the emulated attack, (iv) adapting the emulated attack depending on the interim outcome, and (v) in a subsequent iteration of the iterative process, applying the adapted emulated attack, which was adapted depending on the interim outcome of the given iteration, to the component of the target computer system,
   wherein adapting the emulated attack comprises:
      identifying that the emulated attack was detected;
      upon identifying that the emulated attack was detected by static detection, adding a code obfuscation scheme to the emulated attack; and
      upon identifying that the emulated attack was detected by dynamic detection, adding an evasion scheme to the emulated attack.

10. The method according to claim 9, wherein adapting the emulated attack comprises modifying one or more parameters of the emulated attack.

11. The method according to claim 9, wherein adapting the emulated attack comprises modifying a code obfuscation scheme used by the emulated attack.

12. The method according to claim 9, wherein adapting the emulated attack comprises modifying an evasion scheme used by the emulated attack.

13. The method according to claim 9, wherein adapting the emulated attack comprises modifying source code of the emulated attack and re-compiling the modified source code.

14. The method according to claim 9, wherein adapting the emulated attack comprises modifying machine code of the emulated attack.

15. The method according to claim 9, wherein performing the iterative process comprises switching from the given attack-code template to another attack-code template.

16. The method according to claim 9, further comprising applying benign software code to one or more components of the target computer system, and evaluating a response of the target computer system to the benign software code.

* * * * *